Patented Apr. 9, 1940

2,196,357

UNITED STATES PATENT OFFICE 2,196,357

PREPARATION OF CARBOXYLIC ACIDS

Ellsworth Knowlton Ellingboe and James Emory Kirby, Wilmington, Del., assignors to E. I. du Pont de Nemours & Company, Wilmington, Del., a corporation of Delaware No Drawing. Application April 25, 1938, Serial No. 204,214

10 Claims. (Cl. 260—537)

This invention relates to the preparation of carboxylic acids, more particularly to the preparation of dicarboxylic acids, and still more particularly to the preparation of dicarboxylic acids such as adipic, glutaric, and succinic acids, by the nitric acid oxidation of alicyclic primary amines such as cyclohexylamine.

This invention has as an object the preparation of carboxylic acids by a new and useful method. A further object is the provision of a direct, simple, and economical process for the production of dicarboxylic acids. Other objects will appear hereinafter.

These objects are accomplished by the following invention wherein a primary alicyclic amine having the amino group directly attached to a carbon atom of an alicyclic ring is oxidized to a carboxylic acid with nitric acid, preferably of a concentration of about 50 to 100% and preferably at a temperature between about 50° C. and the boiling point of the oxidation mixture.

The more detailed practice of the invention is illustrated by the following examples, wherein parts given are by weight, unless otherwise stated. There are of course many forms of the invention other than these specific embodiments.

Example I

Cyclohexylamine (19.8 parts, 0.2 mol) was neutralized with an equivalent amount (17.9 parts) of 70% nitric acid, (sp. gr. 1.42) diluted with 33 parts of water, the temperature of the well-stirred solution being maintained at 20° C. This amine-nitrate solution was added gradually to 62.5 parts of 70% nitric acid (sp. gr. 1.42) containing 1.6 parts of fuming nitric acid, and the oxidation mixture maintained at 95° to 100° C. on a steam bath for eight hours after completing the addition. Adipic acid crystallized on cooling and was filtered, further amounts being obtained after concentrating the mother liquors. The total amount of adipic acid isolated was 8.3 parts which amounts to a conversion of 31.6% of the theoretical. Alkalinization and steam distillation of the concentrated mother liquor produced a distillate which was analyzed and found to contain about 3.5 parts (20% of the starting amount) of unoxidized cyclohexylamine.

Example II

A solution of cyclohexylamine nitrate containing one equivalent of excess nitric acid was prepared from 99 parts (1 mol) of cyclohexylamine and 179 parts of 70% nitric acid, (sp. gr. 1.42) at a controlled temperature of 20° C. The resulting clear solution was added gradually to 220 parts of 98% nitric acid (sp. gr. 1.51) at 60° to 70° C., under reflux and with stirring. After the amine nitrate solution had been completely added, the mixture was heated to 90° to 100° C., where it was maintained (with careful control against overheating) while brown nitrogen oxides were being evolved. After colored nitrogen oxides had ceased to be evolved (after about eight hours), the reaction mixture was cooled to 10° C., the crystallized adipic acid was separated by filtration, and the filtrate was concentrated to obtain further amounts of product. Besides adipic acid, a mixture of succinic and glutaric acids was obtained from the final aqueous residues. The yield of adipic acid was 89 to 94 parts (61 to 64% of the theoretical), and the mixture of succinic and glutaric acids accounted for about 20% of the starting amine.

Example III

A solution of cyclohexylamine nitrate containing one equivalent of excess nitric acid was prepared from 99 parts (1 mol) of cyclohexylamine and 179 parts of 70% nitric acid (sp. gr. 1.42), as in Example II. A solution of 69 parts (1 mol) of sodium nitrite in 100 parts of water was added gradually to the amine nitrate solution at room temperature. A very few bubbles of gas evolved. The resulting clear solution was added to 220 parts of 98% nitric acid (sp. gr. 1.51) keeping the oxidizing mixture at 60° C. The mixture was finally stirred and maintained at 90° to 100° C. on a steam bath until no more red fumes were evolved, i. e., for about ten hours. Adipic acid was isolated as before, and unchanged cyclohexylamine was recovered by steam distillation after neutralizing the concentrated mother liquor with alkali, e. g., sodium hydroxide or carbonate. The amount of adipic acid obtained was 66.9 parts (45.8% of the theoretical conversion), and 15 parts (about 15%) of the original cyclohexylamine was recovered unchanged.

Example IV

A cyclohexylamine nitrate solution containing only a slight excess of nitric acid was prepared from 99 parts (1 mol) of cyclohexylamine and 100 parts of 70% nitric acid (sp. gr. 1.42) containing 19 parts of water. To this was added a solution of 69 parts of sodium nitrite in 100 parts of water. After standing overnight at room temperature the mixture was finally heated under reflux on a steam bath for one hour. The oil layer was separated and oxidized at 55° C. by adding it dropwise to 312 parts of 70% nitric acid containing 0.1 part of added ammonium vanadate. The oxidation mixture was heated at 55° to 60° C. for one hour, the aqueous layer from which the oil had been separated added, and the whole boiled under reflux for several hours. Adipic acid (61.7 parts) was obtained which amounts to 42.30% of theory. About 10% of the cyclohexylamine was recovered unchanged.

Cyclohexylamine may also be oxidized by a one-step procedure whereby it is dropped directly into the hot oxidizing nitric acid. Under these conditions, in which salt formation and oxidation take place simultaneously, intense fuming occurs and special precautions must be taken to prevent loss of reactants, since these fumes are not readily condensable. Therefore, procedures involving prior salt formation are preferred.

As indicated above the amine may be oxidized from the preformed nitrate or nitrite or by oxidation of the amine without previous salt formation, i. e. simultaneously with any salt formation. Of course, when the amine is added to nitric acid previous to bringing the reaction mixture under oxidation conditions the amine is present in the reaction mixture as the amine nitrate.

The process as described in the examples above is generally applicable to any cycloaliphatic, i. e., alicyclic primary amine. It is noteworthy that secondary amines, which might be considered to be equivalent to the corresponding primary amines for the purpose of an oxidation such as this, do not react in the same way. Dicyclohexylamine, for example, was practically unchanged after being treated by the procedure of Example II. Thus, the invention is applicable to the primary cycloaliphatic or alicyclic amines derived from the homologous cyclic polymethylene hydrocarbons, e. g., cyclobutylamine, cyclopentylamine, etc., those derived from terpenes, e. g., bornylamine, fenchylamine, etc., and those derived from hydrogenated nuclear-substituted aniline derivatives, e. g., the 2-, 3-, or 4-methylcyclohexylamines. It is to be emphasized that by cycloaliphatic amine is meant an amine wherein the amino group (NH₂) is directly attached to a carbon atom of an alicyclic carbocyclic ring. While amines wherein the primary amino group is attached to hydrocarbon are preferred, including amines wherein the ring carries hydrocarbon substituents such as alkyl, aryl, and aralkyl radicals the process of the invention is also applicable to alicyclic amines wherein the alicyclic ring also carries non-hydrocarbon substituents, e. g., heterocyclic radicals, carbonyl groups, halogen, nitro, etc.

In its broadest aspect the process is applicable to any alicyclic primary amine, i. e., a compound containing a primary amino group directly attached to a carbon of an alicyclic ring.

The oxidation of cycloaliphatic primary amines to carboxylic acids by means of nitric acid may be carried out over a range of conditions and methods of procedure. The amine may be added directly to the oxidizing solution at the desired temperature or, preferably, it may be first neutralized in the cold with a part of the total nitric acid to be used. The amine may also be treated with nitrous acid prior to its oxidation with nitric acid. The oxidation may be carried out effectively with nitric acid of concentrations in the range of about 50 to 100% and at temperatures in the range 50° C. to the boiling point under ordinary pressure. Catalysts such as ammonium vanadate may also be added to the oxidizing agent. About three to ten mols, and preferably between four and six mols, of nitric acid are used per mol of amine.

The carboxylic acids produced by the process of the present invention are of use in the preparation of plasticizers, resins and the like.

The present process is of advantage in that it permits the elimination of steps in the manufacture of the carboxylic acids from common materials. Thus in the manufacture of adipic acid by the process of the present invention, the adipic acid is the third product from benzene whereas in the process via chlorobenzene it is the fourth product as is shown in the following:

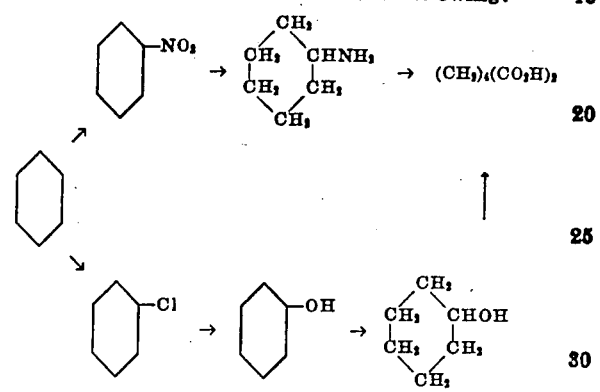

Moreover the invention also provides a means of utilizing nitrocyclohexane, which is obtained as a by-product to adipic acid from the nitric acid oxidation of cyclohexane. As an auxiliary process with the latter, the route from benzene to adipic acid is further shortened.

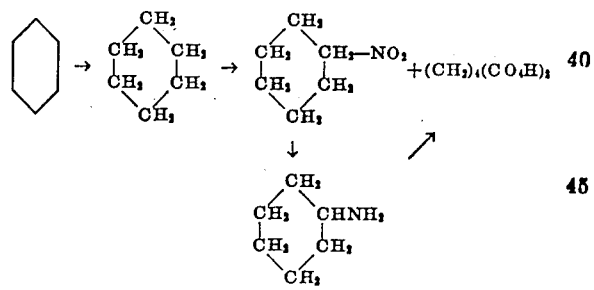

This invention is of advantage in that it represents a novel method for the preparation of aliphatic carboxylic acids and is applicable to the preparation of a wide variety of carboxylic acids, some of which are not obtainable or at least readily obtainable by other methods.

The above description and examples are intended to be illustrative only. Any modification of or variation therefrom which conforms to the spirit of the invention is intended to be included within the scope of the claims.

We claim:

1. Process for the production of adipic acid which comprises oxidizing cyclohexylamine at a temperature of at least 50° C. in the liquid phase with nitric acid of 50–100% concentration.

2. Process for the production of adipic acid which comprises oxidizing preformed cyclohexylamine nitrate at a temperature of at least 50° C. in the liquid phase with nitric acid of 50 to 100% concentration.

3. Process for the production of adipic acid which comprises reacting preformed cyclohexylamine nitrate in aqueous solution with nitrous acid and reacting said preformed pretreated cyclohexylamine nitrate in the resulting solution with nitric acid of 50 to 100% concentration containing nitrogen oxides in solution.

4. Process for the production of adipic acid which comprises oxidizing cyclohexylamine with nitric acid.

5. Process for the production of carboxylic acids which comprises oxidizing cyclohexylamine with nitric acid.

6. Process for the production of carboxylic acids which comprises oxidizing a primary cyclohexylamine with nitric acid.

7. Process for the production of carboxylic acids which comprises oxidizing, with nitric acid, a primary alicyclic amine wherein the amino group is attached to a hydrocarbon radical by an alicyclic ring carbon.

8. Process for the production of polycarboxylic acids which comprises oxidizing, with nitric acid, a cycloaliphatic primary amine.

9. In a process for the preparation of polycarboxylic acids by the nitric acid oxidation of a primary alicyclic amine, the step which comprises isolating unchanged amine from the reaction mixture by alkalinization followed by steam distillation.

10. Process for the production of polycarboxylic acids which comprises oxidizing, with nitric acid, a member of the class consisting of cyclic aliphatic primary amines and the nitrates and nitrites thereof.

ELLSWORTH KNOWLTON ELLINGBOE.
JAMES EMORY KIRBY.